US010527316B2

(12) United States Patent
Lee

(10) Patent No.: US 10,527,316 B2
(45) Date of Patent: Jan. 7, 2020

(54) METHOD AND APPARATUS FOR COLLECTING WASTE HEAT OF EXHAUST GAS AND REDUCING WHITE SMOKE

(71) Applicant: Dong Hoon Lee, Gyeonggi-do (KR)

(72) Inventor: Dong Hoon Lee, Gyeonggi-do (KR)

( * ) Notice: Subject to any disclaimer, the term of this patent is extended or adjusted under 35 U.S.C. 154(b) by 344 days.

(21) Appl. No.: 14/909,116

(22) PCT Filed: Oct. 1, 2014

(86) PCT No.: PCT/KR2014/009244
§ 371 (c)(1),
(2) Date: Apr. 19, 2017

(87) PCT Pub. No.: WO2015/050367
PCT Pub. Date: Apr. 9, 2015

(65) Prior Publication Data
US 2017/0261230 A1 Sep. 14, 2017

(30) Foreign Application Priority Data

Oct. 4, 2013 (KR) .......................... 10-2013-0118603

(51) Int. Cl.
*F24H 8/00* (2006.01)
*F23J 15/06* (2006.01)

(52) U.S. Cl.
CPC ................ *F24H 8/00* (2013.01); *F23J 15/06* (2013.01); *F23J 2219/70* (2013.01);
(Continued)

(58) Field of Classification Search
CPC .......... F24H 8/00; F23J 2219/70; F23J 15/06; Y02P 80/152; Y02B 30/102; Y02E 20/363
See application file for complete search history.

(56) References Cited

U.S. PATENT DOCUMENTS 2,235,322 A * 3/1941 Martin ................... B01D 53/26
261/3
2,746,844 A * 5/1956 Johnson ................ C07C 17/156
422/141
3,279,203 A * 10/1966 Leonard, Jr. ............ F25B 15/06
62/103
(Continued)

FOREIGN PATENT DOCUMENTS

JP 0933024 * 10/1992
JP 09-033024 2/1997
(Continued)

*Primary Examiner* — Steven S Anderson, II
(74) *Attorney, Agent, or Firm* — KORUS Patent, LLC; Seong Il Jeong

(57) ABSTRACT

The present invention provides a method for collecting waste heat of exhaust gas and reducing white smoke, and an apparatus to which the method can be easily applied, the method comprising the steps of: introducing exhaust gas from an exhaust gas supply source including high-temperature steam to a heat and moisture exchange unit, collecting latent heat of the steam contained in the exhaust gas by making contact between the exhaust gas and a solution containing hydroscopic salts, condensing the collected latent heat, and discharging the processed exhaust gas to the outside of the heat and moisture exchange unit; and concentrating, cooling, and circulating the solution containing the hydroscopic salts by discharging, to a lower part of the heat and moisture exchange unit, a mixture of the solution containing the hydroscopic salts and condensation water.

10 Claims, 1 Drawing Sheet

(52) U.S. Cl.
CPC .......... *Y02B 30/102* (2013.01); *Y02E 20/363* (2013.01); *Y02P 80/152* (2015.11)

(56) References Cited

U.S. PATENT DOCUMENTS

| | | | | |
|---|---|---|---|---|
| 3,969,482 | A * | 7/1976 | Teller | B01D 53/60 423/235 |
| 4,205,529 | A * | 6/1980 | Ko | F24F 3/1417 62/235.1 |
| 4,355,683 | A * | 10/1982 | Griffiths | F24D 11/007 165/60 |
| 6,804,964 | B2 * | 10/2004 | Bellows | B01D 53/1418 60/39.5 |
| 2007/0012187 | A1 * | 1/2007 | Deen | B01D 53/263 95/242 |
| 2008/0178733 | A1 * | 7/2008 | Gal | B01D 53/1456 95/9 |
| 2008/0237035 | A1 * | 10/2008 | Kurusu | B01D 47/06 204/242 |
| 2009/0084728 | A1 * | 4/2009 | Kirts | B01D 53/263 210/638 |
| 2011/0033359 | A1 * | 2/2011 | Papenheim | B01D 53/502 423/235 |
| 2013/0125842 | A1 * | 5/2013 | Frick | F22B 1/00 122/7 R |
| 2013/0175004 | A1 * | 7/2013 | Dube | F28D 15/00 165/61 |
| 2017/0002731 | A1 * | 1/2017 | Wei | F24H 1/0072 |

FOREIGN PATENT DOCUMENTS

| | | |
|---|---|---|
| KR | 10-1992-0017703 | 10/1992 |
| KR | 10-2002-0034205 | 5/2002 |
| KR | 10-0375555 | 3/2003 |
| KR | 10-2003-0072779 | 9/2003 |
| KR | 10-1200330 | 11/2012 |

* cited by examiner

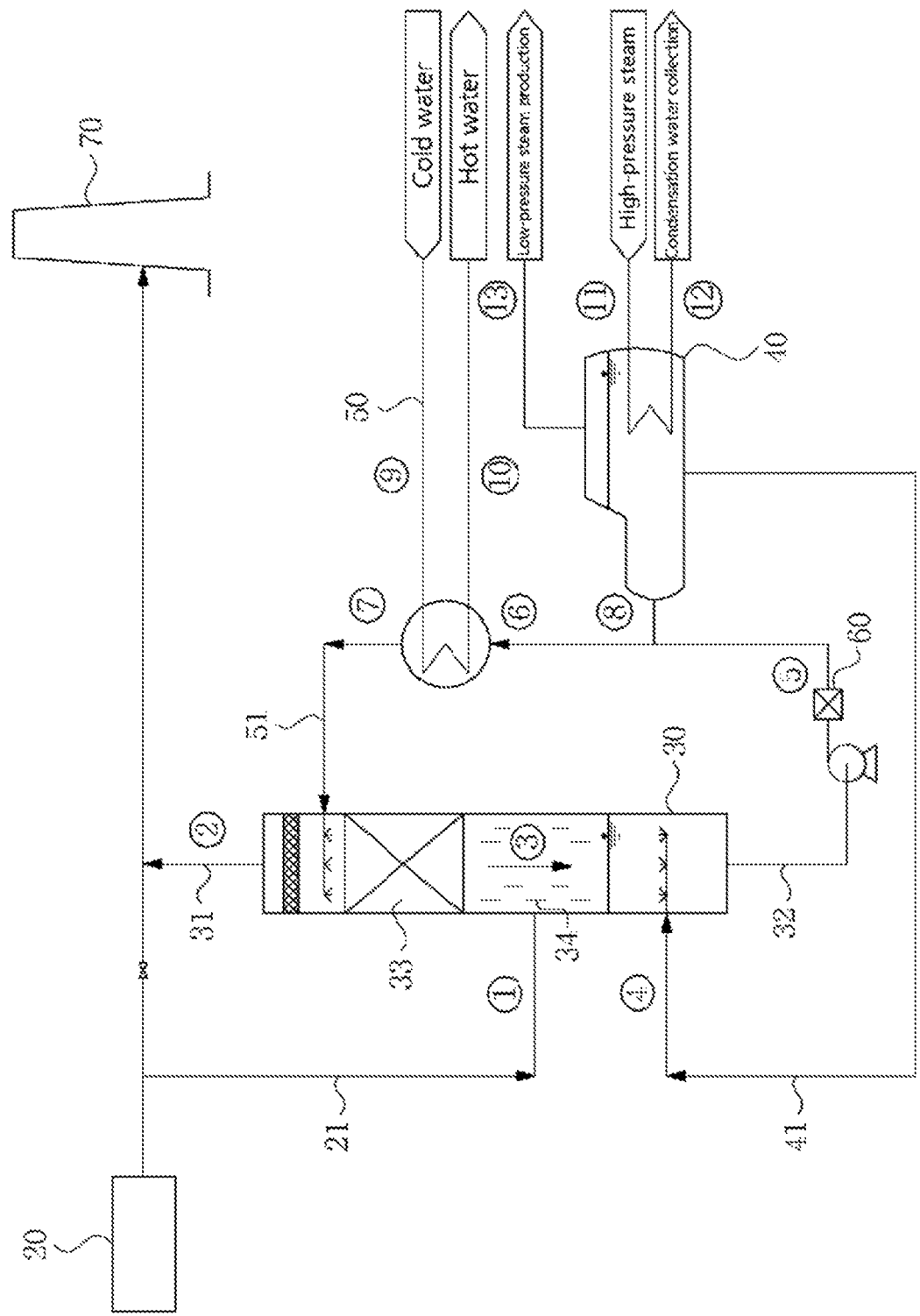

METHOD AND APPARATUS FOR COLLECTING WASTE HEAT OF EXHAUST GAS AND REDUCING WHITE SMOKE

TECHNICAL FIELD (a) Technical Field

The present disclosure relates to a method and apparatus for collecting waste heat of exhaust gas and reducing white smoke.

(b) Background Art

In general, since an incinerator, metal melting furnace, boiler, wet type devulcanization facility, etc. which are facilities of discharging atmospheric pollution material discharge the high temperature exhaust gas containing the high concentration pollution material to the atmosphere during operation, mainly an absorption tower (wet type dust collection facility) for removing the toxic material by injecting an aqueous solution to remove the pollution material included in such exhaust gas has been installed and used.

In this wet type dust collection facility, the water is sprayed to the discharged high temperature exhaust gas, and accordingly, the exhaust gas at the exit is discharged to the atmosphere through the funnel in the condition of high temperature high humidity (saturated). At this time, since the moisture included in the exhaust gas includes the polluted material and the saturated moisture which has not been removed in advance in the wet type dust collection facility, the exhaust gas containing the saturated moisture at the time of discharge at the funnel is immediately cooled by the cool outside atmosphere and condensed so that the saturated moisture in the exhaust gas which is increased in terms of the gravity is changed into the condition of the drop of water (water drop) and falls down collectively around the funnel and at the same time pollutes the periphery of the funnel.

In addition, the water drop which is the drop of water which has comparatively low gravity is not diffused but falls down to a certain distance from the funnel while forming the white smoke which is the steam bane, and the fallen water drop corrodes the peripheral facility and generates the complain of the population.

Conventionally, in case of wet removing the toxic gas generated at the polluted material discharge facility, to prevent the white smoke from being generated through the funnel, the atmosphere among the exhaust gas is removed by reducing the relative humidity of the exhaust gas by mixing the high temperature air from the outside or directly heating the exhaust gas by installing the burner at the funnel, however, the former has a problem of very high installation cost, and the latter has a problem of high maintenance cost according to the fuel consumption.

For example, as the patent documents for solving such problems, there are a lot of patent documents including Patent documents 1 and 2. However, these patent documents not only include complicated facility (wet type dust collection facility), etc. but also still have not appropriately solved the problem of the white smoke. In addition, these patent documents remain at the level of the conventional heat exchange of the waste heat of the exhaust gas and there is a tendency that it is not efficient in view of the energy utilization.

In the meantime, the exhaust gas discharged at the generation source facility such as the incinerator, etc. contains the saturated moisture in the high temperature condition.

Reviewing the physical property of the highly humid exhaust gas by using the already known psychometric chart, it is known that according to the t-x chart having the dry-bulb temperature and the absolute humidity as the coordinates, the increment curve of the absolute humidity forms a slow curve (gradually increase) in the zone of 0~60° C., and the absolute humidity increases along the stiff increment curve in the zone of 60~70° C., and the absolute humidity increases almost vertically even due to the minute temperature difference in the zone of temperature of 70° C. and above.

Therefore, if the exhaust gas in the temperature zone of the temperature discharged from the exhaust gas discharge source such as the incinerator, boiler, etc. that is, in the temperature zone of 60° C. and above can be lowered to the temperature and humidity having the economical efficiency (exit temperature 60° C. and below and absolute humidity 40° C. and below) and discharged to the atmosphere in the condition of supercooling, the white smoke generated white smoke can be mostly reduced.

Patent document 1: Korea registered patent 10-1200330
Patent document 2: Korea registered patent 10-0375555

SUMMARY OF THE DISCLOSURE

Accordingly, in the present invention, the exhaust gas in the temperature zone of 60~200° C. containing the high temperature steam discharged from the exhaust gas discharge source such as the incinerator, boiler, etc. could be effectively lowered to the economical temperature and humidity (exit temperature 60° C. and below, absolute humidity 40° C. and below) by using the solution containing the hydroscopic salts which can efficiently absorb the latent of the steam, and the present invention has been completed based on this.

Therefore, the first object of the present invention is to provide an ideal method of reducing white smoke which solves the pollution problem due to the water fall around the funnel by effectively collecting the waste heat of the exhaust gas discharged from the exhaust gas discharge source such as an incinerator, boiler, etc. and by suppressing the white smoke, and removes the visual pollution factor, and has low maintenance cost.

The second object of the present invention is to provide an appropriate apparatus used in the method for collecting waste heat of exhaust gas and reducing white smoke.

[1] The method for collecting waste heat of exhaust gas and reducing white smoke to accomplish the first object of the present invention comprises steps of:

introducing exhaust gas from an exhaust gas supply source including high-temperature steam to a heat and moisture exchange unit, collecting latent heat of the steam contained in the exhaust gas by making contact between the exhaust gas and a solution containing hydroscopic salts, condensing the collected latent heat, and discharging the processed exhaust gas to the outside of the heat and moisture exchange unit; and concentrating, cooling, and circulating the solution containing the hydroscopic salts by discharging, to a lower part of the heat and moisture exchange unit, a mixture of the solution containing the hydroscopic salts and condensation water.

[2] In the [1], as the hydroscopic salts, one or more is selected from a group consisting of calcium nitrate, ammonium nitrate, ammonium sulfate, barium nitrate, barium perchlorate, potassium formate, sodium chlorate, natrium nitrate, potassium nitrate, sodium chloride, calcium chloride.

[3] In the [1], the concentration of the hydroscopic salts is maintained to 40~80 weight % in the solution containing the hydroscopic salts.

[4] In the [1], the exhaust gas is supplied from the lower part of the heat and moisture exchange unit, and the solution containing the hydroscopic salts is supplied at the upper part of the heat and moisture exchange unit, and the ratio of contact of the exhaust gas and the solution containing the hydroscopic salts 1:2~10 weight portion, and the contact time is at least 5 seconds.

[5] In the [1], the step of circulating comprises steps of:
pumping for supplying the solution containing the hydroscopic salts discharged from the lower part of the heat and moisture exchange unit to the upper part of the heat and moisture exchange unit;
receiving the part of the solution containing the hydroscopic salts from the heat and moisture exchange unit, heating and concentrating the received solution containing the hydroscopic salts, and supplying the concentrated solution containing the hydroscopic salts to the heat and moisture exchange unit; and p receiving the solution containing the hydroscopic salts from the heat and moisture exchange unit, and heat exchanging the received solution containing the hydroscopic salts.

[6] In the [5], the method further comprises step of filtering which removes the polluted material introduced from the outside after the step of pumping.

[7] The apparatus for collecting waste heat of exhaust gas and reducing white smoke to accomplish the second object of the present invention comprises:
an exhaust gas supply source including the high temperature steam;
a heat and moisture exchange unit which is connected to the exhaust gas supply source so that the high temperature exhaust gas and steam are flowing in and the solution containing the hydroscopic salts is supplied;
an exhaust gas discharge unit which is connected to the heat and moisture exchange unit so that the cooled exhaust gas is discharged, and
a circulation and supply unit which is connected to the heat and moisture exchange unit so that the solution containing the hydroscopic salts is condensed, cooled and circulated.

[8] In the [7], the exhaust gas supply source is connected to the lower part of the heat and moisture exchange unit, and the solution containing the hydroscopic salts is provided at the upper part of the heat and moisture exchange unit.

[9] In the [7], the heat and moisture exchange unit includes a bead for increasing the contact area of the high temperature exhaust gas and steam and the solution containing the hydroscopic salts.

[10] In the [7], the circulation and supply unit comprises:
a pump to which the solution containing the hydroscopic salts flowing in from the heat and moisture exchange unit and which supplies the solution containing the hydroscopic salts to the upper part of the heat and moisture exchange unit;
a heating and condensing unit to which the part of the solution containing the hydroscopic salts flows in from the heat and moisture exchange unit, which heats and concentrates the flown in solution containing the hydroscopic salts, and which supplies the concentrated solution containing the hydroscopic salts to the heat and moisture exchange unit; and a heat exchange unit to which the solution containing the hydroscopic salts flows in from the heat and moisture exchange unit and which heat exchanges the received solution containing the hydroscopic salts flowing in.

[11] In the [7], the heat and moisture exchange unit includes a storage facility having an agitation facility which mixes the solution containing the hydroscopic salts which is lowered to the lower part of the heat and moisture exchange unit and the solution containing the hydroscopic salts which is condensed at the heating and condensing unit.

[12] In the [10], the apparatus further comprises a filter which is placed at the rear end of the pump and removes the polluted material introduced from the outside.

[13] In the [7], as the hydroscopic salts, one or more can be selected from a group consisting of calcium nitrate, ammonium nitrate, ammonium sulfate, barium nitrate, barium perchlorate, potassium formate, sodium chlorate, natrium nitrate, potassium nitrate, sodium chloride, calcium chloride.

Effect of the Invention

As described above, the present invention has effects of solving the pollution problem due to the water fall around the funnel by collecting the moisture and latent heat by contacting the exhaust gas and the solution containing the hydroscopic salts and by suppressing the white smoke discharged through the funnel, and of removing the visual pollution factor, and of having low maintenance cost, and of collecting the waste heat effectively, and of raising the economical efficiency.

BRIEF DESCRIPTION OF THE DRAWINGS

FIG. 1 is a process flow schematically showing the entire process of chemically collecting waste heat of exhaust gas generated from a boiler and reducing white smoke according to an embodiment of the present invention.

DETAILED DESCRIPTION

Before further specifically describing the present invention, it is to be stressed that the terminologies or the words used in the present specification and the claims shall not be limited to the usual meaning or the dictionary meaning but shall be interpreted as the meaning and the concept suitable to the technical thoughts of the present invention based on the principle that the concept of the terminologies can be properly defined to best describe the invention. Therefore, it should be appreciated that the structure of the embodiments recorded in the present specification is only a preferred example of the present invention but does not represent all of the technical thoughts of the present invention, and there can be a variety of equivalents and changes which can substitute the embodiments at the time of application of the present invention.

Hereinafter, the preferred embodiments of the present invention will be described in detail with reference to the accompanying drawing so that those skilled in the art to which the present invention belongs to can easily practice the present invention.

As described above, the present invention relates to a method and apparatus for removing white smoke generated due to moisture among exhaust gas discharged from an exhaust gas discharge source such as an incinerator, boiler, etc., and collecting waste heat. More specifically, the present invention relates to the field of controlling atmosphere pollution among the field of environment engineering, and its detailed field corresponds to treatment of the white smoke (steam) generated due to moisture among exhaust gas, and the present invention relates to a method and apparatus for reducing the white smoke in which the moisture contained in the exhaust gas supersaturated with moisture is absorbed by using a solution containing hydroscopic salts and at the same time collecting latent heat, and at this time, the moisture among exhaust gas is cooled and condensed so that absolute humidity is lowered so that a phenomenon of white smoke does not occur in a mixed gas discharged to the atmosphere and a phenomenon of gravity increase due to condensed moisture is suppressed so as to increase an effect of diffusion into the atmosphere so that a phenomenon of fall (fall of dust) of the condensed moisture and the pollution material around a funnel is removed.

Briefly summarizing, the present invention collects the latent heat from the moisture contained in the exhaust gas generated at the time of combustion of fuel by using the solution containing the hydroscopic salts and reduces the white smoke by absorbing the moisture contained in the exhaust gas by using the chemical heat collecting method.

This method for chemically collecting waste heat and reducing white smoke and this apparatus using the method can use the solution containing the hydroscopic salts as a water absorbing agent and a heat absorbing agent, absorb the steam of the exhaust gas, and thereafter, if the concentration of the hydroscopic salts in the solution containing the hydroscopic salts is lowered, maintain a constant concentration by heating and evaporating a part of circulation solution by using a high pressure steam to restore to the constant concentration, and at this time a low pressure steam can be produced.

The method for collecting waste heat of exhaust gas and reducing white smoke of the present invention comprises the steps of: introducing exhaust gas from an exhaust gas supply source including high-temperature steam to a heat and moisture exchange unit (for example, wet type dust collection facility), collecting latent heat of the steam contained in the exhaust gas by making contact between the exhaust gas and a solution containing hydroscopic salts, condensing the collected latent heat, and discharging the processed exhaust gas to the outside of the heat and moisture exchange unit; and concentrating, cooling, and circulating the solution containing the hydroscopic salts by discharging, to a lower part of the heat and moisture exchange unit, a mixture of the solution containing the hydroscopic salts and condensation water.

For the hydroscopic salts used in the present invention, it is preferable that it has high solubility, has large solubility difference according to the temperature, and not only is not harmful to human body but also does not induce public pollution, and does not have combustibility and/or explosiveness, and it is further preferable that it is a material of absorbing the heat at the time of resolution.

In one embodiment of the present invention, as the hydroscopic salts, one or more can be selected from a group consisting of calcium nitrate, ammonium nitrate, ammonium sulfate, barium nitrate, barium perchlorate, potassium formate, sodium chlorate, natrium nitrate, potassium nitrate, sodium chloride, calcium chloride.

According to the present invention, if the exhaust gas in the temperature of the exhaust gas supplied from the exhaust gas discharge source such as the incinerator, boiler, etc., that is, the temperature zone of 60° C. or higher and the solution containing the hydroscopic salts are contacted at the heat and moisture exchange unit (for example, wet type dust collection facility, absorption tower, etc.), the temperature and the humidity can be lowered to those (exit temperature 60° C. or below, absolute humidity 40° C. or below) having economical efficiency which can be discharged to the atmosphere. In other words, the moisture contained in the exhaust gas is absorbed to the hydroscopic salts to the maximum, and accordingly, the property of the exhaust gas discharged has the temperature similar to that of supplying the solution in which the moisture is absorbed from the supplied exhaust gas and is circulated and which contains the hydroscopic salts, and the phase contains the absolute water of supercooling state at this temperature. If the exhaust gas is discharged to the atmosphere in the supercooling state, the white smoke generated from the exhaust gas can be mostly reduced.

As such, the present invention can minimize the white smoke and at the same time can collect the moisture latent heat of the exhaust gas to the maximum by removing the moisture contained in the exhaust gas to and below the content at which the white smoke is generated, by contacting and cooling the exhaust gas in the supersaturation condition discharged from the facility and the solution containing the hydroscopic salts.

In one embodiment of the present invention, when maintaining the concentration of the hydroscopic salts to 40~80 weight % in the solution containing the hydroscopic salts, the hydroscopic salts can absorb the steam of the exhaust gas to the maximum, collect the latent heat of the seam, and condense the steam efficiently. In this case, if the content of the hydroscopic salts is below 40 weight %, the absorption rate is reduced, and if the content of the hydroscopic salts exceeds 80 weight %, the hydroscopic salts is deposited or solidified. The contents of the hydroscopic salts have different absorption rate for each hydroscopic salt in the above range, therefore, the heat and moisture exchange unit shall be designed and installed to maintain the appropriate absorption rate and such design and installation can be easily devised.

In another embodiment of the present invention, the exhaust gas is generally supplied from the lower part of the heat and moisture exchange unit and moved to the upper part, and the solution containing the hydroscopic salts is supplied at the upper part of the heat and moisture exchange unit, and they directly contact at the middle part of the heat and moisture exchange unit. At this time, to increase the contact area of the high temperature exhaust gas and the solution containing the hydroscopic salts, the heat and moisture exchange unit can install a contact and fix layer including a bead (or filler) at the middle part thereof. In the meantime, for the ratio of contact of the exhaust gas and the solution containing the hydroscopic salts, in case the exhaust gas is 1 weight portion, it is efficient in view of reaction efficiency that the solution containing the hydroscopic salts is 2~10, and at least 5 seconds and preferably about 10-30 seconds of the contact time can condense the steam of the exhaust gas efficiently and economically. Here also, the ratio of the amount of the exhaust gas and the solution containing the hydroscopic salts differs for each saline material in the range described above, the design and the installation structure of the heat and moisture exchange unit which efficiently condenses the steam of such exhaust gas can be easily devised.

According to another embodiment of the present invention, the solution containing the hydroscopic salts discharged to the lower part of the heat and moisture exchange unit can be circulated by using an apparatus such as a pump to be supplied to the upper part of the heat and moisture exchange unit. In addition, selectively, the solution containing the hydroscopic salts which contacted the exhaust gas can include the polluted material introduced from the outside, and the polluted material can be filtered and removed by using a means such as a filter.

Furthermore, a part of the solution containing the hydroscopic salts circulated as such is heated and condensed by a heating and condensing means, and the condensed solution containing the hydroscopic salts is supplied to the lower part of the heat and moisture exchange unit in the condition of increased temperature. In this way, the concentration of the hydroscopic salts in the solution containing the hydroscopic salts can be maintained in the range of 40~80 weight %. To be able to maintain the concentration to the above range, the concentration is measured through a measuring sensor installed at one or more places of the apparatus according to the present invention, and the amount of the solution containing the hydroscopic salts to be input to the heating and condensing means is determined by an auto monitoring system using such measurement result. As such, the solution containing the hydroscopic salts in the condition of increased temperature which is supplied to the lower part of the heat and moisture exchange unit is mixed with the solution containing the hydroscopic salts which is lowered from the upper part to the lower part of the heat and moisture exchange unit so as not only to maintain the concentration range but also to increase the temperature of the solution containing the hydroscopic salts stored in a storage facility of the heat and moisture exchange unit.

In the meantime, the waste heat of the solution containing the hydroscopic salts circulated from the heat and moisture exchange unit is collected by using an apparatus such as the heat and moisture exchange unit. According to the present invention, the amount of the waste heat collected as such is larger than that in case of directly heat exchanging the exhaust gas supplied from the exhaust gas discharge source, this is because the solution containing the hydroscopic salts has absorbed to the maximum the latent heat of the steam contained in the exhaust gas.

FIG. 1 is a process flow schematically showing the entire process of chemically collecting waste heat of exhaust gas generated from a boiler and reducing white smoke according to an embodiment of the present invention. Referring to FIG. 1, an apparatus to which the method for collecting waste heat of exhaust gas and reducing white smoke of the present invention can be applied comprises an exhaust gas supply source 20, a heat and moisture exchange unit 30, an exhaust gas discharge unit 31, and a circulation and supply unit 32.

According to a certain embodiment of the present invention, the exhaust gas supply source 20 includes the steam of high temperature of 60° C. and above, and the exhaust gas and the steam of high temperature flow into the lower part of the heat and moisture exchange unit 30 from a pipe 51 connected to the exhaust gas supply source, and the solution 34 containing the hydroscopic salts is supplied through a pipe 51 connected to the upper part of the heat and moisture exchange unit 30. Such exhaust gas supply source 20 can have a blowing fan and/or a duct (not shown) which suck in the exhaust gas and input it into the heat and moisture exchange unit 30. At the forward end of the pipe 51 can be attached an injection apparatus. In the meantime, the exhaust gas discharge unit 31 is connected to the heat and moisture exchange unit 30, and through this the solution 34 containing the hydroscopic salts is processed and the cooled exhaust gas is discharged, and the discharged exhaust gas is emitted through a funnel 70. The circulation and supply unit 32 is connected to the lower part of the heat and moisture exchange unit 30 and circulates the solution containing the hydroscopic salts to the upper part of the heat and moisture exchange unit 30 through the pipe 51.

In one embodiment of the present invention, the heat and moisture exchange unit 30 can generally include a bead 33 for increasing the contact area of the high temperature exhaust gas, the steam, and the solution containing the hydroscopic salts. These bead and installation structure are well known to those skilled in the art.

According to another embodiment of the present invention, the circulation and supply unit 32 comprises a pump, a heating and condensing unit 40, and a heat exchange unit 50. The pump circulates the solution 34 containing the hydroscopic salts from the heat and moisture exchange unit 30 so as to supply the solution containing the hydroscopic salts to the upper part of the heat and moisture exchange unit 30. Into the heating and condensing unit 40 is flown a part of the solution containing the hydroscopic salts circulated from the lower part of the heat and moisture exchange unit 30. The solution containing the hydroscopic salts which flow in as such is heated and condensed for example by high pressure steam. The condensed solution containing the hydroscopic salts is again supplied to the lower part of the heat and moisture exchange unit 30 through a pipe 41 in the condition of increased temperature. At this time, the condensed water obtained by condensing the solution containing the hydroscopic salts is collected at the heat and moisture exchange unit 30, and the low pressure steam is generated to the upper part of the heating and condensing unit 40 so that the waste heat is collected. In the meantime, the heat exchange unit 50 obtains the hot water by heat exchanging from the solution containing the hydroscopic salts circulated by the pump from the lower part of the heat and moisture exchange unit 30.

According to another embodiment of the present invention, the lower part of the heat and moisture exchange unit 30 includes the storage facility which can store the solution containing the hydroscopic salts, and the storage facility can include an agitating facility which mixes the solution 34 containing the hydroscopic salts which is lowered to the lower part of the heat and moisture exchange unit and the condensed solution containing the hydroscopic salts which is supplied through the pipe 41 from the heating and condensing unit. The storage facility can have the capacity of the magnitude being capable of storing the solution containing the hydroscopic salts circulated during the operation time of 20 minutes and more. Selectively, the apparatus of the present invention can further include a filter 60 which is positioned at the rear end of the pump so as to be able to remove the polluted material introduced from the outside. The filter 60 can prevent a blocking of the facility due to impurities from the supplied exhaust gas.

In the meantime, according to another embodiment of the present invention, the apparatus can further include an opening/closing member (not shown) which is opened and closed at the time of maintaining and/or repairing of the inside.

As described above, according to the present invention, since the humidity of the mixture gas at the funnel is maintained to be low so that the phenomenon of occurring of the white smoke generated by the saturated moisture at the facility which discharges the exhaust gas can be basically suppressed or can be processed with high efficiency, the white smoke generated during the process of wet type removing of atmospheric polluted material at the incinerator, devulcanization facility, non-ferrous metal melting furnace, chemical product manufacturing facility, etc. and the steam generated at each industrial washing facility can be effectively removed.

In addition, the present invention have effects that it can omit a lot of fuel consumption for heating and complicated facilities necessary for removing the white smoke in the conventional method and can remove the white smoke stably and with high efficiency so as to greatly reduce the problem of occurring the white smoke generated at a lot of funnels up to now and the phenomenon of falling of the condensed water and polluted material around the funnel.

In addition, there is an effect of efficient energy management by collecting the latent heat of the steam contained in the exhaust gas. Therefore, there is an effect of saving the maintenance cost and can anticipate an effect of saving the installation cost so as to be able to seek a more economical measure of prevention of the white smoke so as to be able to solve the problem of difficulty of practicing.

Hereinafter, the present invention has been further specifically reviewed through the embodiments and comparison, however, the scope of the present invention is not limited to those.

Embodiment 1

In the present embodiment, the degree of collection of waste heat of the exhaust gas and reduction of the white smoke was confirmed by using a simulation test apparatus such as FIG. 1.

Table 1 shown below show the phase (liquid phase or gas phase), temperature, pressure and flow speed of each stream of the solution containing the exhaust gas or the hydroscopic salts and the concentration of the hydroscopic salts (hereinafter referred to as "concentration") in the solution containing the hydroscopic salts in the simulation test apparatus such as FIG. 1. For the hydroscopic salts, calcium nitrate was used.

TABLE 1

| Stream No. | Phase | Temperature (° C.) | Pressure (kg/cm$^2$) | Flow Speed (kg/h) | Concentration (weight %) |
|---|---|---|---|---|---|
| ① | 기상 | 114 | — | 12.373 | — |
| ② | 기상 | 55 | — | 11.291 | — |
| ③ | 액상 | 77 | — | 62.800 | 64 |
| ④ | 액상 | 130 | — | 14.100 | 70 |
| ⑤ | 액상 | 86 | — | 76.900 | 65 |
| ⑥ | 액상 | 86 | — | 61.700 | 65 |
| ⑦ | 액상 | 53 | — | 61.700 | 53 |
| ⑧ | 액상 | 86 | — | 15.200 | 65 |
| ⑨ | 액상 | 49 | — | 49.800 | — |
| ⑩ | 액상 | 72 | — | 49.800 | — |
| ⑪ | 기상 | 140 | 3.6 | 1.930 | — |
| ⑫ | 액상 | 140 | 3.6 | 1.930 | — |
| ⑬ | 기상 | 130 | 2.5 | 1.090 | — |

In the table 1, stream ① contains about 13.2 weight % of steam, and stream ② contains about 3.3 weight % of steam.

In the meantime, the collected heat amount of the exhaust gas of the exhaust gas stream ① was calculated by using a general heat exchanger (apparatus such as 50 of FIG. 1) without processing such as the present invention and as a result, it was 175,200 kcal/hr, and the phenomenon of white smoke and water drift was observed at the funnel. To the contrary, the exhaust gas stream ① was processed according to the embodiment 1 and the supplied heat amount (supplied heat amount at ⑪ of FIG. 1) was excluded from the collected heat amount (sum of the collected heat amount at ⑩, ⑫ and ⑬ of FIG. 1), and the result was 714,130 kcal/hr. As a result, there was an effect of collection of waste heat about 5 times that in case of using the simple heat exchanger, and the phenomenon of white smoke and water drift was not observed at the funnel.

The invention has been described in detail with reference to preferred embodiments thereof, however, it will be appreciated by those skilled in the art that it is only for specifically describing the present invention and the method and apparatus for collecting waste heat of exhaust gas and reducing white smoke are not limited to those but a transformation and improvement may be made by those skilled in the art within the scope of the technical thoughts of the present invention.

It will be appreciated by those skilled in the art that all of the simple transformation and change of the present invention belong to the scope of the present invention, and the concrete scope of protection of the present invention will be made obvious by the appended claims.

What is claimed is:

1. A method for collecting waste heat of exhaust gas and reducing white smoke comprising steps of:
   introducing exhaust gas from an exhaust gas supply source including high-temperature steam to a heat and moisture exchange unit;
   collecting latent heat of the steam contained in the exhaust gas by making contact between the exhaust gas and a solution containing hydroscopic salts, and condensing the steam;
   discharging the processed exhaust gas to an outside of the heat and moisture exchange unit; and
   circulating the solution containing the hydroscopic salts by discharging the solution from a lower part of the heat and moisture exchange unit and returning the solution to the heat and moisture exchange unit,
   wherein the step of circulating comprises:
   pumping the solution from the lower part of the heat and moisture exchange unit to an upper part of the heat and moisture exchange unit;
   receiving a first portion of the solution from the heat and moisture exchange unit, concentrating the first portion of the solution by heating the first portion of the solution and producing low pressure steam, and returning the concentrated first portion of the solution directly to the solution in the lower part of the heat and moisture exchange unit, thereby maintaining a concentration of the hydroscopic salts of the solution in the lower part of the heat and moisture exchange unit at a predetermined range and increasing a temperature of the solution in the lower part of the heat and moisture exchange unit to a predetermined level; and
   receiving a second portion of the solution from the heat and moisture exchange unit, heat-exchanging the second portion of the solution to cool the second portion of the solution, and returning the cooled second portion of the solution to the upper part of the heat and moisture exchange unit.

2. The method of claim 1, wherein the hydroscopic salts comprise at least one member selected from the group consisting of calcium nitrate, ammonium nitrate, ammonium sulfate, barium nitrate, barium perchlorate, potassium formate, sodium chlorate, natrium nitrate, potassium nitrate, sodium chloride, and calcium chloride.

3. The method of claim 1, wherein the concentration of the hydroscopic salts is maintained at 40 to 80 weight % in the solution containing the hydroscopic salts.

4. The method of claim 1, wherein the exhaust gas is supplied to the lower part of the heat and moisture exchange unit, and the ratio of mass flowrates of the exhaust gas and the second portion of the solution flowing down from the upper part of the of the heat and moisture exchange unit is 1:2 to 1:10, and the contact time is at least 5 seconds.

5. The method of claim 1, further comprising filtering foreign substances from the solution, the foreign substances being introduced from the exhaust gas.

6. An apparatus for collecting waste heat of exhaust gas and reducing white smoke comprising:
   an exhaust gas supply source for supplying the exhaust gas including high-temperature steam;
   a heat and moisture exchange unit which is connected to the exhaust gas supply source such that the exhaust gas including the high-temperature steam is supplied into a lower part of the heat and moisture exchange unit and contacts with a solution containing hydroscopic salts, causing the steam to be condensed and the exhausted gas to be cooled;
   a circulation and supply unit which is connected to the heat and moisture exchange unit se such that the solution containing the hydroscopic salts is circulated by discharging the solution from the lower part of the heat and moisture exchange unit and returning the solution to the heat and moisture exchange unit; and
   an exhaust gas discharge unit which is connected to the heat and moisture exchange unit such that the cooled exhaust gas is discharged from the heat and moisture exchange unit to an outside,
   wherein the circulation and supply unit comprises:
   a pump for pumping the solution from the lower part of the heat and moisture exchange unit to an upper part of the heat and moisture exchange unit;
   a heating and condensing unit for receiving a first portion of the solution from the heat and moisture exchange unit, concentrating the first portion of the solution by heating the first portion of the solution and producing a low pressure steam, and returning the concentrated first portion of the solution directly to the solution in the lower part of the heat and moisture exchange unit, thereby maintaining a concentration of the hydroscopic salts of the solution in the lower part of the heat and moisture exchange unit at a predetermined range and increasing a temperature of the solution in the lower part of the heat and moisture exchange unit to a predetermined level; and
   a heat exchange unit for receiving a second portion of the solution from the heat and moisture exchange unit, heat-exchanging the second portion of the solution to cool the second portion of the solution, and returning the cooled second portion of the solution to the upper part of the heat and moisture exchange unit.

7. The apparatus of claim 6, wherein the heat and moisture exchange unit includes a filler for increasing the contact area of the high temperature exhaust gas including steam and the solution containing the hydroscopic salts.

8. The apparatus of claim 6, wherein the heat and moisture exchange unit includes a storage facility having an agitation device which mixes the first portion of the solution returned to the lower part of the heat and moisture exchange unit and the second portion of the solution flowed down to the lower part of heat and moisture exchange unit.

9. The apparatus of claim 6, further comprising a filter which is placed on a pump loop and removes foreign substances from the solution, the foreign substances being introduced from the exhaust gas.

10. The apparatus of claim 6, wherein the hydroscopic salts comprise at least one member selected from the group consisting of calcium nitrate, ammonium nitrate, ammonium sulfate, barium nitrate, barium perchlorate, potassium formate, sodium chlorate, natrium nitrate, potassium nitrate, sodium chloride, and calcium chloride.

* * * * *